(12) United States Patent
Gruber et al.

(10) Patent No.: US 11,460,123 B2
(45) Date of Patent: Oct. 4, 2022

(54) DEVICE FOR CONTROLLING A VALVE

(71) Applicant: Robert Bosch GmbH, Stuttgart (DE)

(72) Inventors: Manuel Gruber, Lohr am Main (DE); Frank Knoll, Gelnhausen (DE); Peter Ommert, Aschaffenburg (DE)

(73) Assignee: Robert Bosch GmbH, Stuttgart (DE)

( * ) Notice: Subject to any disclaimer, the term of this patent is extended or adjusted under 35 U.S.C. 154(b) by 42 days.

(21) Appl. No.: 17/076,089

(22) Filed: Oct. 21, 2020

(65) Prior Publication Data

US 2021/0123540 A1   Apr. 29, 2021

(30) Foreign Application Priority Data

Oct. 24, 2019   (DE) ...................... 10 2019 216 401.3

(51) Int. Cl.
*F16K 31/06*   (2006.01)
(52) U.S. Cl.
CPC .............................. *F16K 31/0675* (2013.01)
(58) Field of Classification Search
CPC .................................................. F16K 31/0675
See application file for complete search history.

(56) References Cited

U.S. PATENT DOCUMENTS 7,809,473 B2 * 10/2010 Shajii .................... G05D 7/0635
 137/487
8,589,016 B2 * 11/2013 Bange .................... H02M 3/156
 375/238

* cited by examiner

*Primary Examiner* — Eric Keasel
(74) *Attorney, Agent, or Firm* — Maginot, Moore & Beck, LLP

(57) ABSTRACT

A device for controlling a valve with an electromagnet having a coil fed by a current, includes a closed-loop control unit configured to control the current using a closed-loop control circuit, the closed-loop control circuit having a plurality of elements which are set by a plurality of control parameters to generate an actual pressure value at the valve, the actual pressure value depending upon the dead volume. The device includes a dead volume setting unit configured to adapt to a change in dead volume while accounting for a nonlinear relationship between the dead volume and the plurality of control parameters by simultaneously setting the plurality of control parameters based upon a single dead volume parameter.

10 Claims, 1 Drawing Sheet

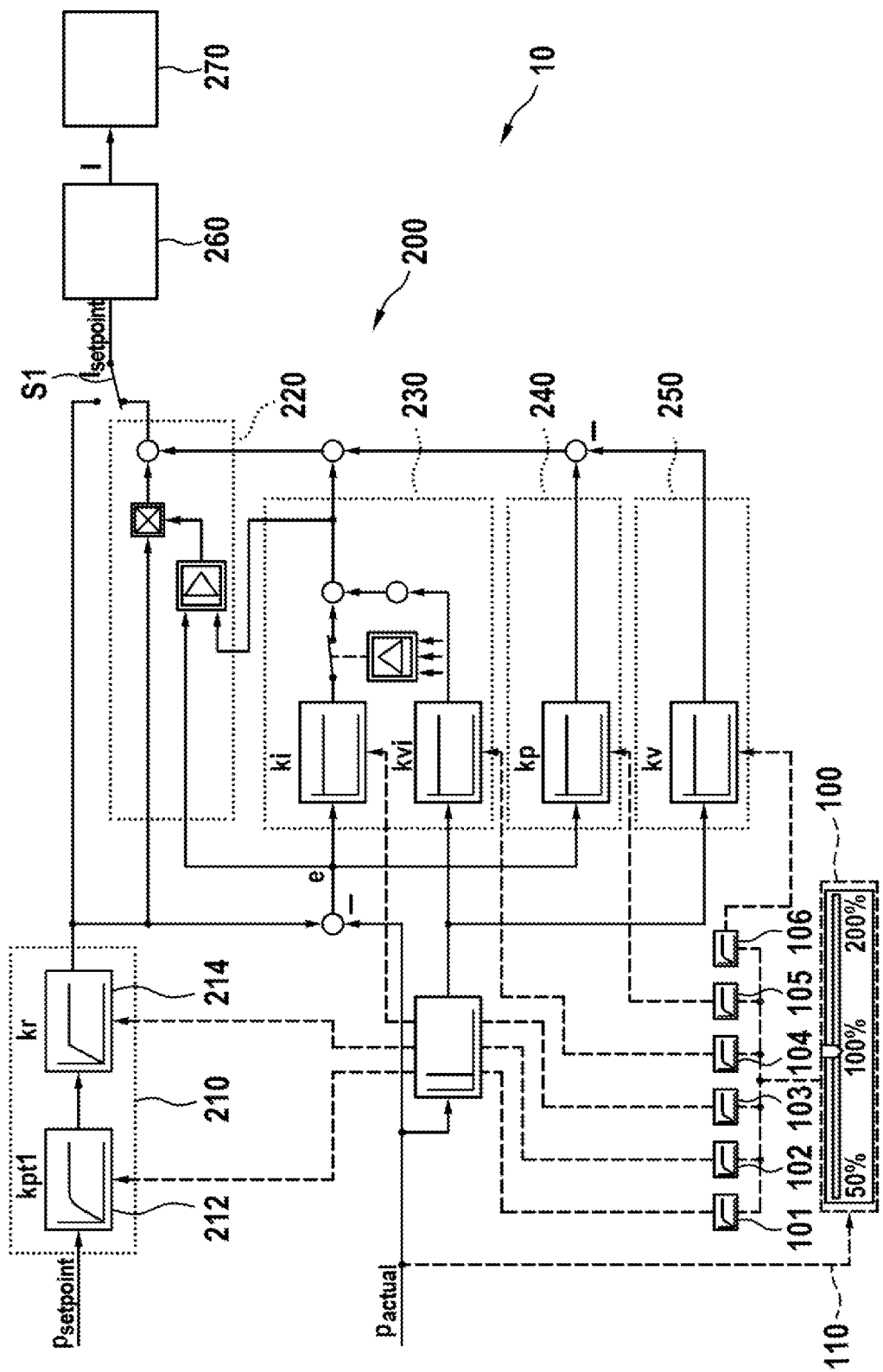

DEVICE FOR CONTROLLING A VALVE

This application claims priority under 35 U.S.C. § 119 to patent application no. DE 10 2019 216 401.3, filed on Oct. 24, 2019 in Germany, the disclosure of which is incorporated herein by reference in its entirety.

The present disclosure relates to a device for controlling a valve, in particular for controlling a proportional pressure relief valve.

BACKGROUND

Use is increasingly being made now of digital valves which are actuated using a digital closed-loop control unit. Here, the closed-loop control unit, for controlling a current by which the valve is actuated, may be set individually according to an application by way of a multiplicity of control parameters. The pressure which is established at the valve is in this case chiefly dependent on the current, the behavior of the pressure build-up on the other hand being dependent on the dead volume in the system. If the dead volume is then however to be adapted in a user-specific manner via the closed-loop control unit, the multiplicity of control parameters has to be set. In this case, a change in the dead volume is not proportional and not linear with respect to the change in the control parameters. For a user, finding the optimal settings for the control parameters is therefore difficult or not possible with reasonable effort.

SUMMARY

It is therefore an object of the present disclosure to provide a device for controlling a valve that makes it possible for the dead volume in a valve to be set in a simple manner.

Said object is achieved by the features of the disclosure.

BRIEF DESCRIPTION OF THE DRAWINGS

An embodiment of the present disclosure will be described below with reference to the appended FIGURE, in which:

FIG. 1 shows a representation of a device for controlling a valve according to the present disclosure.

DETAILED DESCRIPTION

A valve used in a hydraulic system has an electromagnet 270, with the aid of which the valve is actuated, that is to say consequently opened or closed. For this purpose, a coil of the electromagnet 270 is fed a corresponding current I. The fed current I gives rise to a force in the valve. The actual pressure value $p_{actual}$ that is established at the valve is in this case chiefly dependent on the diameter of the valve seat. In the case of changes in the dead volume in the system of the user, the manner in which the current I is built up has to be adapted via a closed-loop control unit 200.

The current I that is fed to the coil is controlled here by the closed-loop control unit 200, in which a closed-loop control circuit is implemented. The closed-loop control circuit acquires as input variables an actual pressure value $p_{actual}$, which is detected by a pressure sensor integrated in the valve, and a setpoint pressure value $p_{setpoint}$. The closed-loop control circuit is intended to be used merely by way of example below, and it should be noted that any other closed-loop control circuit which is configured in such a way that it controls the current I for actuating the valve is able to be used. The closed-loop control unit 200 also has a communication interface (not shown), such as for example a wired (for example ethernet) and/or a wireless (for example Bluetooth) interface, and possibly further components (not shown).

The closed-loop control unit 200 shown in FIG. 1 has the following elements, which are set by way of the associated control parameters. The setpoint pressure value $p_{setpoint}$ is firstly input into a setpoint value generator 210. A setpoint value application 220, an I component 230, a P component 240 and a velocity feedback 250 follow the setpoint value generator 210. The output from these elements, that is to say the setpoint current value $I_{setpoint}$, is then input into a current controller 260, with the result that the current I that is to be fed to the coil of the electromagnet 270 is provided.

In the example shown, the behavior, dependent on the dead volume, of the closed-loop control unit 200 depends on the parameters kpt1 of the PT1 filter 212, kr of the ramp 214, ki of the I component 230, kvi of the velocity feedback of the I component 230, kp of the P component 240 and kv of the velocity feedback for the P component 250.

Consequently, these control parameters have to be changed in order to adapt the valve control behavior to the dead volume of the user system. Furthermore, in the case of the dead volume changing, it is necessary to adapt not only one control parameter, but multiple control parameters simultaneously. However, since there is a non-proportional and nonlinear relationship between said control parameters and the dead volume, for a user, finding the optimal settings for the control parameters is difficult or involves great effort.

For this reason, the device 10 according to the disclosure has a dead volume setting unit 100, which is configured in such a way that, for adaptation to the dead volume, it simultaneously sets the control parameters using a single dead volume parameter, with the relationship between the control parameters and the dead volume taken into account. For the user, this yields the great advantage that it is necessary to set anew merely this one parameter whenever the dead volume in the user system changes.

The control parameters of the closed-loop control circuit are then set accordingly, with the relationship between the control parameters and the dead volume being taken into account automatically. Here, according to the disclosure, the non-proportional and nonlinear relationship is implemented by way of characteristic curves 101 to 106, which are separately available for each control parameter. The different characteristic curves 101 to 106 for the setting of the individual control parameters are in this case determined beforehand via corresponding hydraulic test series for a type of the valve. Here, the characteristic curves 101 to 106 are interpolated by way of a mathematical function equation. The characteristic curves 101 to 106 may however also be stored in the dead volume setting unit 100 in another known manner.

The dead volume setting unit 100 is realized here in the form of software with a graphical user interface. For this reason, in FIG. 1, the dead volume setting unit 100 is shown by a slide control, which indicates the values from 50% to 200%, with 50% corresponding to a large dead volume (slow) and 200% corresponding to no dead volume (aggressive). A value of 100% corresponds to a normal state. The dead volume setting unit 100 may however be realized in another manner, such as for example a rotary knob or a text input in the software.

Furthermore, the closed-loop control unit 200 has the communication interface, with the result that an external device (not shown) is capable of communicatively connecting to the closed-loop control unit 200. The external device is moreover configured in such a way that the dead volume setting unit 100 is implemented in the external device. After the connection to the closed-loop control unit 200 has been established, the dead volume setting unit 100 reads the dead volume parameter and indicates it in the dead volume setting unit 100 (for example the slide control is moved to the corresponding position). Here, the external device may be a smartphone, a tablet or a laptop, on which the dead volume setting unit 100 is implemented as an application or app. The dead volume setting unit 100 may however also be implemented as part of an application.

Although the relationship between the dead volume and the control parameters is taken into account during the setting by the dead volume setting unit 100, it is nevertheless possible for the case to occur where the control of the pressure at the valve becomes unstable. For this reason, the dead volume setting unit 100 has a connection 110 via which the actual pressure value $p_{actual}$ is input into the dead volume setting unit 100. Accordingly, the dead volume setting unit 100 capable of establishing an instability of the control of the actual pressure value $p_{actual}$. In such a case, the dead volume cannot remain set to the presently selected value. According to the disclosure, the dead volume parameter is reset to a previous value for which it has been determined that control of the actual pressure value $p_{actual}$ is stable. Consequently, the present disclosure offers the additional advantage that the stability of the control of the actual pressure value $p_{actual}$ is monitored, and that countermeasures are taken if the control of the actual pressure value $p_{actual}$ becomes unstable.

What is claimed is:

1. A device for controlling a valve with an electromagnet having a coil fed by a current, the valve being configured to control a pressure of a system in a manner that is dependent on a dead volume of the system, the device comprising:
   a closed-loop control circuit configured to control the current, the closed-loop control circuit having a plurality of elements which are set by a plurality of control parameters to generate an actual pressure value at the valve, the actual pressure value depending upon the dead volume; and
   a dead volume setting device configured to (i) receive a dead volume parameter indicating the dead volume of the system via a user interface and (ii) adapt the plurality of control parameters based on the dead volume parameter while accounting for a non-proportional and nonlinear relationship between the dead volume of the system and the plurality of control parameters.

2. The device according to claim 1, wherein:
   the dead volume setting device is configured to store a respective characteristic curve for each of the plurality of control parameters and adapt each of the plurality of control parameters using the respective characteristic curve.

3. The device according to claim 2, wherein the respective characteristic curve for each of the plurality of control parameters is determined by a test series.

4. The device according to claim 3, wherein the respective characteristic curve for each of the plurality of control parameters is interpolated as a function equation.

5. The device according to claim 1, further comprising:
   an external device that implements at least part of the dead volume setting device and which is communicatively connected to the closed-loop control circuit,
   wherein the dead volume setting device is configured receive the dead volume parameter via the external device.

6. The device according to claim 1, wherein the dead volume setting device is configured to check the setting of the plurality of control parameters using the actual pressure value.

7. The device according to claim 6, wherein:
   the dead volume setting device is configured to revert to a previous value of dead volume parameter for which control of the actual pressure value at the valve was stable when control of the actual pressure value at the valve becomes unstable.

8. The device according to claim 1, wherein the dead volume setting device is configured to receive the dead volume parameter via a graphical user interface implemented in software.

9. The device according to claim 1, wherein the dead volume setting device is configured to receive the dead volume parameter via a text input implemented in software.

10. The device according to claim 1, wherein the dead volume setting device is configured to receive the dead volume parameter via a rotary knob.

* * * * *